Jan. 4, 1927.  1,613,363
J. TESSIER
LIGHT MODIFYING DEVICE FOR CAMERAS
Filed April 9, 1924
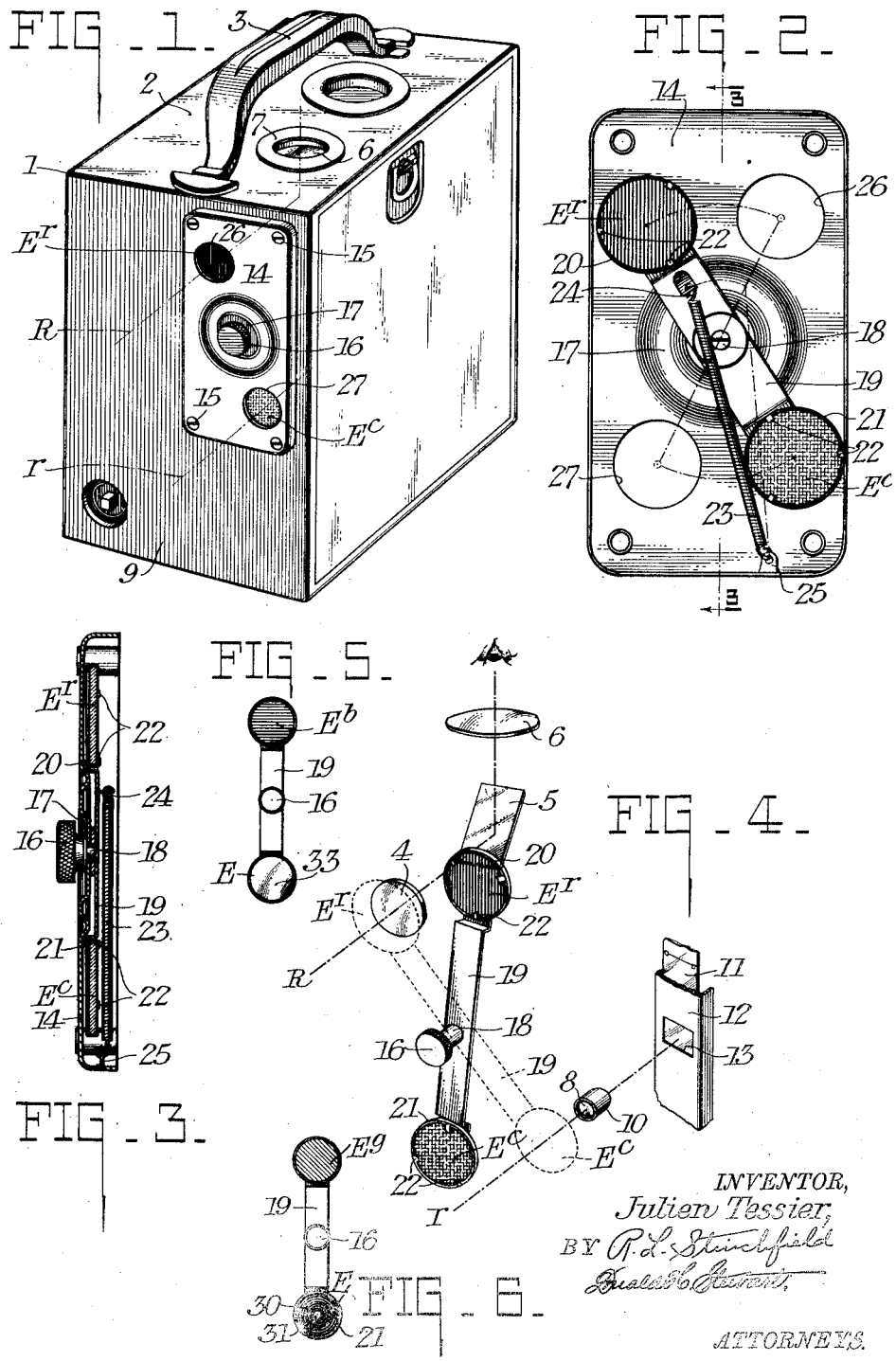
INVENTOR,
Julien Tessier,
BY
ATTORNEYS.

Patented Jan. 4, 1927.

1,613,363

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

LIGHT-MODIFYING DEVICE FOR CAMERAS.

Application filed April 9, 1924. Serial No. 705,380.

This invention relates to photography, and more particularly to photographic cameras. It has for its object to provide a light regulating device in which the light modification is automatically brought to the attention of the camera operator. Another object is to provide a single control for changing the light modification member and the signalling member at the same time. Still another object is to provide a signal of a colored screen to attract the operator's attention. Other objects will appear from the following specification, the novel features being pointed out in the claims at the end thereof.

In the drawings, wherein like reference characters denote like parts throughout,—

Fig. 1 is a perspective view of a motion picture camera having a light modifying device constructed in accordance with and illustrating one form of my invention;

Fig. 2 is a rear plan view of the light modifying device removed from a camera;

Fig. 3 is a section on line 3—3 of Fig. 2 with certain parts in different positions from that shown in Fig. 2;

Fig. 4 is a diagrammatic perspective view of a preferred form of my invention, and Figs. 5 and 6 are modifications of my invention showing different light modifying means.

In cameras of any type the light entering the objective which passes to the photographically light sensitive material in the camera, may be modified in various ways, such as by placing a color screen, portrait attachment, different diaphragm opening, or the like, in the path of the light rays. Such modifications are sometimes made and then forgotten by an operator, so that subsequent exposures made without thought of the light modification device are failures. My present invention calls the operator's attention to the modification through altering the light entering the finder as well as that entering the camera.

In Fig. 1 I have shown, by way of illustration, a simple type of motion picture camera equipped with my device. The camera consists of a body 1 having a top 2, on which there is a handle 3. The finder consists of a positive lens 4 (Fig. 4), a mirror 5 and a viewing lens 6. Light rays pass along R through the finder thus formed. This last mentioned lens is carried by the cell 7 mounted on the camera top 2. The camera taking lens or objective 8 is inside of the front wall 9, being carried by a cell 10 and being adapted to throw an image upon the film 11, along the line $r$. The film is intermittently drawn through guide 12 past the gate 13 by any well known mechanism or by the mechanism shown in my pending application filed May 3, 1920, Serial No. 378,616 for motion picture apparatus.

On the front 9 there is a housing 14 attached by screws 15. A thumb nut 16 is mounted in a depressed ring 17, the shaft 18 carrying this nut being attached to and supporting arm 19. This arm carries flanges 20 and 21 each having lugs 22 for holding a light modifying element E. A spring 23 attached at 24 to arm 19 and at 25 to housing 14 holds arm 19 in either of the two positions indicated by full and broken lines in Figs. 2 and 4. There are two apertures 26 and 27 in housing 14 opposite the finder lens 4 and the objective 8, and consequently the light modifying elements E move across these openings at the same time to simultaneously modify the light rays entering each lens.

The light may be modified in numerous ways. I prefer to place a colored element E in flange 22 which is adapted to cross the path of light entering the finder lens 4, since a change in the color of the light is generally noticed more quickly than an alteration of the quantity of the light, or a design. In Figs. 1 to 4 I show a red screen, $E^r$, in Fig. 5 a blue $E^b$, and in Fig. 6 a green $E^g$. I do not wish, however, to be limited to these or any other colors, for any positive visible light modification adapted to form a signal is all that is necessary.

The light entering objective 8 can be modified in quantity, for reducing the exposure (when a constant speed shutter is used). This may be done by providing a plate 30 having a small central opening 31. Plate 30 may be held by flange 21, as in Fig. 6. The light may be modified in actinic quality, as by a color screen $E^c$. The screen may be one of any of the well known varieties, and I have adapted, as suitable for the camera shown in Fig. 1, a light yellow screen. The light may also be modified by placing a lens in front of objective 8, such as a positive or "portrait" lens 33, as shown in Fig. 5, or any other of the many well known lens attachments for cameras.

An essential feature of my invention is that the light entering objective 8 shall be modified simultaneously with the light entering lens 4 and vice versa. The operator by glancing at the camera finder can then instantly know the condition of his camera, and errors due to forgetting the lens attachments which may be in place are eliminated.

The operation of the camera shown in Fig. 1 is as follows. When a picture is to be made, the operator glances into the finder, and if the finder shows an uncolored view he knows his objective is unscreened. By turning nut 16, arm 19 is turned bringing $E^r$ opposite lens 4 and screen $E^c$ opposite objective 8. The red color of the image in the finder instantly notifies the operator that the light passing through the objective is modified by the screen.

It is to be understood that the drawings are by way of illustration only and that many changes in structure can be made without departing from my invention, and I contemplate as within the scope of my invention all such modifications as may come within the scope of the appended claims.

Having thus described my invention what I claim as new and desire to secure by Letters Patent is:

1. In combination, a camera having a finder and an objective, a movable transparent light modifying device for the objective adapted to move to and from a position in which it may intercept light rays passing through the objective, and means carried by the camera for indicating in the finder the position of the light modifying device.

2. In combination, a camera having a view finder and an objective, a light modifying device mounted upon the camera and being adapted to move to and from an operative position in which it lies across the axis of the objective, and means for indicating in the finder the position of the light modifying device.

3. In combination, a camera having a view finder and an objective, a movable light modifying device adapted to cooperate with the objective when moved to an operative position, and adapted to lie to one side of the objective when moved to an inoperative position, and means carried by the light modifying device for indicating in the finder the position of the light modifying device.

4. In combination, a camera having a view finder and an objective, a light modifying device for the objective, means for swinging this device to and from the objective, said means also carrying a signal movable to and from the finder, whereby the signal may indicate in the finder the position of the light modifying device with respect to the objective.

5. In combination, a camera including a finder and an objective, a light modifying device movable with respect to the objective, a carrier for this device, the carrier also carrying a color screen, this screen being adapted to move to and from the finder, whereby the relation of the light modifying device to the objective can be determined by the color of the view shown in the finder.

6. In combination, a camera including a finder having a lens, and an objective, a light modifying screen movable to and from the objective, a pivoted arm carrying the light modifying screen on one end, a signal carried by the other end of the arm adapted to cross the axis of the finder lens, the arm simultaneously moving the light modifying screen and the signal so as to indicate in the finder when the light modifying screen is moved to the objective.

7. In combination, a camera having a finder lens and a taking lens, and means associated with and movable to and from these lenses for modifying light rays passing through the lenses.

8. In combination, a camera having a finder and means for admitting light for taking a picture, a predetermined path through which light rays may pass in entering the finder and in entering the camera, and a movable member adapted to carry light modifying elements arranged to cause the elements to cross the light paths above described, whereby the light rays entering the finder and camera may be simultaneously modified.

9. In combination, a camera having a finder and an objective, light rays passing through a definite path to the finder and objective, two light modifying members carried by an arm by which they may be made to intersect the paths of light rays passing to the finder and the objective, one light modifying member consisting of a color screen adapted to color the image appearing in the finder whereby the position of the other light modifying member with respect to the objective may be ascertained from the finder.

10. In combination, a camera having a view finder and an objective, light modifying devices for the finder and objective, said devices being carried by a movable arm having an operative and an inoperative position, and a spring for holding the arm in either position.

11. In combination, a camera having a view finder and an objective, light modifying devices for the finder and objective, said devices being carried by a movable arm having an operative and an inoperative position, and an operating member outside of the camera whereby the arm may be manually controlled.

12. In combination, a camera having a view finder and an objective, movable light modifying devices for the finder and the objective, a housing enclosing the light modifying devices, said housing having apertures in a wall thereof through which light passes to the finder and objective, and a manually controlled member operable from the exterior of the housing for moving the light modifying devices.

13. In combination, a camera having an objective and a finder, a movable light modifying device associated with the objective and being adapted to assume an operative and an inoperative position with respect to the objective, and a colored signal associated with the finder adapted to lie in an operative or an inoperative position with respect thereto, said signal being operable through the light modifying mechanism whereby an operator may by noting the color of the view in the finder determine the position of the light modifying device relative to the objective.

14. A camera having an optical system including an objective and an exposure window, means for varying the optical system to bring into focus at the exposure window images of objects at different distances from the camera, a finder, and means associated therewith for indicating in the finder the status of the varying means.

15. A camera having an optical system including an objective, a supplementary lens and an exposure window, means for moving the supplementary lens to and from alignment with the objective, a finder, and means associated with the finder and connected to the supplementary lens moving means for indicating in the finder the position of the supplementary lens.

Signed at Rochester, New York this 4th day of April 1924.

JULIEN TESSIER.